United States Patent
Bacha et al.

(10) Patent No.: US 6,988,195 B2
(45) Date of Patent: *Jan. 17, 2006

(54) VAULT CONTROLLER SUPERVISOR AND METHOD OF OPERATION FOR MANAGING MULTIPLE INDEPENDENT VAULT PROCESSES AND BROWSER SESSIONS FOR USERS IN AN ELECTRONIC BUSINESS SYSTEM

(75) Inventors: Hamid Bacha, Great Falls, VA (US); Robert Burns, Pembroke Pines, FL (US); Robert B. Carroll, Mt. Kisco, NY (US); Mark Fisk, North Potomac, MD (US)

(73) Assignee: International Business Machines Corp., Armonk, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 10/639,944

(22) Filed: Aug. 13, 2003

(65) Prior Publication Data

US 2004/0034769 A1 Feb. 19, 2004

Related U.S. Application Data

(63) Continuation of application No. 09/223,765, filed on Dec. 31, 1998.
(60) Provisional application No. 60/087,974, filed on Jun. 4, 1998.

(51) Int. Cl.
*H04L 9/00* (2006.01)
*G06F 11/30* (2006.01)

(52) U.S. Cl. .................. 713/151; 713/169; 713/171; 713/193; 713/201; 705/75; 705/76

(58) Field of Classification Search ............... 713/151, 713/152, 156, 193, 155; 705/76–79
See application file for complete search history.

(56) References Cited

U.S. PATENT DOCUMENTS

| 5,822,434 | A | * | 10/1998 | Caronni et al. ............. 713/156 |
| 6,105,013 | A | * | 8/2000 | Curry et al. ................. 705/65 |
| 6,105,131 | A | * | 8/2000 | Carroll ........................ 713/155 |

* cited by examiner

*Primary Examiner*—Kambiz Zand

(57) ABSTRACT

A vault controller manages resources in a secure environment or vault dedicated to an authorized user(s) for conducting electronic business in a distributed information system, e.g., the Internet. The controller includes a web server and a supervisor in a shared object library which runs as part of an HTTP daemon. The supervisor runs as a multi-threaded process and includes multiple service supervisor (SS) threads; a communication supervisor (CS) thread; a request supervisor (RS) thread; state and data tables and a vault daemon to support launching secure processes mapped to users through digital certificates included in user requests to the controller.

21 Claims, 8 Drawing Sheets

38

| User ID | Token | VP Validator Flag | Process ID | VP Start Flag | Socket Descriptor |
|---------|-------|-------------------|------------|---------------|-------------------|
| aaA51 | 9999999999 | False | 32436 | True | 3 |
| aaA7 | 8888888888 | True | 46352 | True | 4 |
| aaA7F | 7777777777 | False | 37463 | False | 5 |
| | | | | | |
| | | | | | |

Vault Process Table

Figure 3A

| VP | Session ID | User Name | Certificate | KRO Flag |
|---|---|---|---|---|
| VP1 | nWUQkossP4z+xCPC14MxhpDhSGdyDK3UzjF73ckVuOQ= | aaA51 | MDCajCCAhOgAwIBAgIENb5ScjAN... | False |
| VP2 | TA/KIDU8XLZ6FbEnv/KIPpJ+YbDDFzAg22cvTPB2LPQ= | aaA7 | | False |
| VP3 | m8/uijRW24TVPqfig/yNfRWIONR4VL6RccBeSh+7m21= | aaA45 | vhiCrTCCAhagAwIBAgIENb5SXDANB... | True |
| VP4 | | | | |
| VPn | | | | |

Session Table

VAULT CONTROLLER SUPERVISOR AND METHOD OF OPERATION FOR MANAGING MULTIPLE INDEPENDENT VAULT PROCESSES AND BROWSER SESSIONS FOR USERS IN AN ELECTRONIC BUSINESS SYSTEM

CROSS-REFERENCE TO RELATED APPLICATIONS

This application is a continuation application of U.S. Ser. No. 09/223,765, filed Dec. 31, 1998, assigned to the same assignee as that of the present invention, which claims the benefit of the filing date of provisional application Ser. No. 60/087974, filed Jun. 4, 1998, wherein both applications are fully incorporated herein by reference.

This application is related to non-provisional application Ser. No. 08/980,022 {SE9-97-005 (1963-7131-US1)} filed, Nov. 26, 1997, now U.S. Pat. No. 6,105,131 issued Aug. 15, 2000, assigned to the same assignee as that of the present invention and fully incorporated herein by reference.

This application further related to the following co-pending applications, all assigned to the same assignee as that of the present inventions and fully incorporated herein by reference:

1. Ser. No. 09/223,766 filed Dec. 31, 1998 (SE9-98-003/1963-7246) entitled "Secure Server Using Public Key Registration and Methods of Operations."

2. Ser. No. 09/223,764 field Dec. 31, 1998 (SE9-98-021/1963-7260) entitled "A Secure Communication System and Method of Operation for Conducting Electronic Commerce Using Remote Vault Agents Interacting with Vault Controller."

3. Ser. No. 09/223,834 filed Dec. 31, 1998 (SE9-98-022/1963-7261) entitled "Vault Controller Based Registration Application Serving Web Based Registration Authorities and End Users for Conducting Electronic Commerce in a Secure End-to-End Distributed Information System."

BACKGROUND OF THE INVENTION

1. Field of the Invention

This invention relates to secure controllers in secure end-to-end communication systems. More particularly, the invention relates to vault controllers for managing resources in secure environments or vaults individually dedicated to an authorized user for conducting electronic business in a distributed information system, e.g. the Internet.

2. Background Discussion

Traditionally, organizations, such as retailers, banks, and insurance companies in conducting electronic business, register their customers or users and control their access to business software applications with a user identification (user ID) and password. The user ID and password establish a user identity for accessing secure information. The password is the "virtual key" that authenticates a user. However, a password does not provide the security needed for electronic business. Passwords have the following limitations:

(a) Can be compromised during log-on by on-lookers;

(b) Can be easily intercepted on the Internet if the transaction is not secured with a secure web protocol, such as a secure socket layer (SSL);

(c) Authenticate a user to a host but not a host to a user;

(d) Can be discovered using automatic "trial and error" techniques;

(e) Do not protect transmitted information; and (f) Do not ensure the access is limited to authorized entities and applications.

A new approach to conducting electronic business on the Internet is described in the cross-reference application. In this approach, digital keys have replaced user identification password pairs. Public key cryptography uses mathematically related public-private key pairs. Only the private key can decrypt the information the public key has encrypted. The public key can be made available to anyone. The private key is kept secret by the holder.

Just as digital keys are replacing user identification-password pairs in electronic business, digital signals are replacing physical signatures. A digital signature is a coded message affixed to a document or data that helps guarantee the identity of the sender, thereby providing a greater level of security of the physical signature. A digital signature identifies the sender because only the sender's private key can create the signature. The key also helps ensure the content of the signed message cannot be altered without the recipient being able to discover that the message has been altered. Digital certificates are replacing their physical counterpart—hard copy credentials. Digital certificates issued by a certification authority vouch for (or certify) the key of an individual, software application, organization or business. The certificate performs a role similar to that of a driver's license or medical diploma—the certificate certifies that the bearer of the corresponding private key is authorized (by an organization) to conduct certain activities for that organization.

However, the life cycle of digital certificates is similar to that of physical certificates. Digital certificates are issued after authorization in which a user is given the right to use a digital certificate for classified amount of time. The certificate may be temporarily suspended when a user reports a lost certificate. The certificate may be resumed or revoked by the organization. Finally, digital certificates expire and for secure end-to-end communications in electronic business, the certificate must be validated to determine whether the certificate has expired, been revoked, or suspended.

Digital certificates are issued through authorized registrars known as Registration Authorities (RAs). The authorities determine whether the applicant should be authorized to access secure applications or services and set in motion the process to issue a certificate. A Certification Authority (CA) issues the digital certificate after approval by the Registration Authority. The certificate is a binding between a public key and an identity, i.e., a person, organization, or computer device. The certificate includes a subject name; issuer name; public key; validity; unique serial number; and CA digital signature. A CA guarantee's the authenticity of the certificate through its digital signature. The certificate may be revoked at any time. The serial numbers of the revoked certificates are added to a Certification Revoked List (CRL) published in an X.500 Directory based on a standard defined by the International Telecommunications Union (ITU).

IBM "Vault" technology, described in the related application Ser. No. 08/980,022, supra provides strong authentication of clients and servers using digital keys and digital certificates for conducting electronic business. Briefly stated, "Vault" technology provides a secure environment in a web server using a vault controller for running a secure web-based registration process and enabling secure applications of an organization for the conduct of electronic business. The controller provides security from other processes running on the same server in personal storage vaults, e.g. a directory on disk to which only the owner has a key. The content of the vault is encrypted and contains an encryption key pair and signing key pair, both of which are password protected. Each vault has a unique distinguished name in an X.500 directory that provides storage for specific items essential to a Public Key Infrastructure (PKI) using digital certificates. Certificate authorities, Registration Authorities, Certificate Management Services, and Distributed Directory Services are used to verify the identity and authority of each party involved in transactions conducted over the Internet. System operators, administrators, Certificate authorities, Registration authorities and others cannot get to stored information or secure processes in such personal vaults. Combined with a Secure Sockets Layer (SSL) communication protocol, the controller enables secure transactions to be conducted between end users and others, e.g. business organizations using the personal vaults.

In order to effectively conduct electronic business in a secure end to end manner, there is a need for a vault controller which can manage browser requests to user-independent, multi-threaded, persistent and stateful secure processes in dedicated vaults linked to an user with a specific vault access certificate.

SUMMARY OF THE INVENTION

An object of the invention is a vault controller for managing multiple browser requests to user-independent, multi-threaded, persistent, stateful, and secure processes running in user dedicated vaults.

Another object is a vault controller for validating users based on digital certificates, and mapping them to their corresponding user IDs. Another object is a vault controller for mapping users to secure processes running in assigned "personal" vaults not accessible by other users.

Another object is a vault controller for maintaining process and session information in a stateless HTTP environment for users conducting electronic business in a distributed information system. Another object is a vault controller for launching secure processes in vaults on behalf of assigned users and managing the communications between each user and the launched processes.

These and other objects, features and advantages are achieved in a vault controller including a web server and a supervisor in a shared object library which runs as part of an HTTP daemon. The supervisor acts as a link between an end user sitting at a browser and an application running as a process in a secure environment or vault dedicated to the user. The supervisor runs as a multi-threaded process and includes multiple service supervisor threads for processing user requests; a communication thread for handling communications between user dedicated vault processes and the user; a request supervisor for processing special requests; state data tables; and secure communication with a vault daemon to support launching secure processes in the dedicated user vaults. Initializing the vault controller starts the communication supervisor thread, the request supervisor thread, and initializes the state data tables. A user request to the vault controller starts a service supervisor thread which determines whether the user has presented a digital certificate for executing a vault process mapped to the user. If the user presents a certificate, the service supervisor takes the serial number of that certificate and maps it to a user ID. If a certificate is not presented or is invalid, the service supervisor maps the user to a validator process (primarily used for the generation and renewal of vault access certificates). Thereafter, the service supervisor determines if the user ID exists in a state data table. If the ID does not exist in the table, the service supervisor thread partially creates a row in the state table (populates user ID and token fields of the table) and blocks the request until a Vault Process has been launched. The service supervisor sends a message to a vault daemon to generate a password for the user based on the user ID. The vault daemon then launches a process running in a vault mapped to the user ID as a Vault Process. After launching, the Vault Process returns a message back to the communication supervisor including a token identifying the supervisor thread responding to the end user requests. The communications supervisor verifies the token and then populates the remainder of the process table entry including the file descriptor for the open socket. This action unblocks the service supervisor thread which then sends the user request to the socket for the secure vault process mapped to the user ID. The Vault Process dedicated to the user receives the user request and launches a vault process thread to process the request. After processing the request, the vault process thread writes data through the socket to the communication supervisor for return to the browser and end user.

BRIEF DESCRIPTION OF THE DRAWINGS

The invention will be further understood from a detailed description of a preferred embodiment taken in conjunction with an appended drawing, in which:

FIG. 3A is a state table reflecting currently active vault processes in FIG. 3;

FIG. 3B is a state table reflecting currently active user sessions for vault processes listed in FIG. 3A;

DETAILED DESCRIPTION OF THE INVENTION

Figure 1:
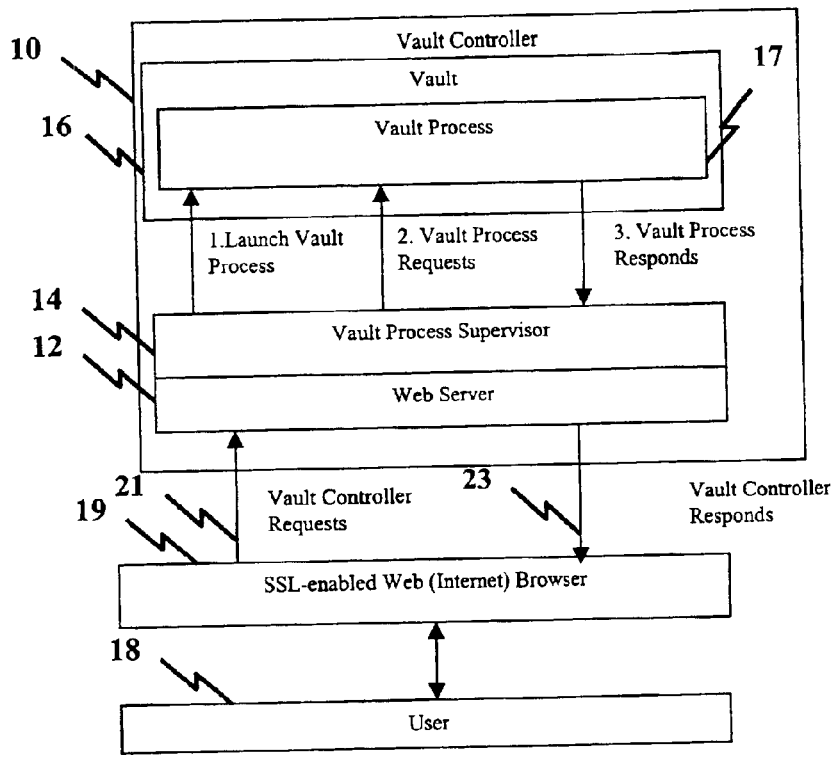
FIG. 1 is a representation of a vault controller including a web server, a vault supervisor and user vault processes incorporating the principles of the present invention.

In FIG. 1, a vault controller 10 of the present invention includes a web server 12 coupled to a vault process supervisor 14. The supervisor 14 interacts with a vault process 17 and a user 18. The user acting through a web browser 19 submits vault controller requests 21 to execute processes for conducting electronic business and receives vault controller responses 23. The web server 12 is a secure, scaleable, high performance, transaction-ready web server that:

(1) Allows a web browser to interface with software products that provide a web-based public framework using digital certificates to authenticate the parties involved in electronic business and public key cryptography to protect the confidentiality and integrity of the electronic business transaction;

(2) Allows a web browser to communicate securely with the software product via the standard secure web protocol, Secure Sockets Layer (SSL); and (3) Authenticates a user's digital certificate and key.

The server 12 interacts with the vault process supervisor 14 which manages all vault processes which run in vaults to be described hereinafter in FIG. 2. The vault process supervisor:

(1) Maps user's to their vaults: Using browser client authentication and the SSL protocol, a browser request is encrypted and sent to the vault controller along with a vault access certificate, previously obtained from a Registration Authority, as described in Ser. # 08/980,022, supra. The vault process supervisor validates the vault access certificate. The request is mapped to a corresponding vault assigned to the certificate owner.

(2) Launches vault processes as needed: The supervisor maintains a state table for determining whether a vault process is already running on behalf of a user. If a process is already running, the supervisor will attach the user to the existing vault process. Next, the supervisor launches the vault process with a corresponding user ID and password by using information from the certificate. The vault process shuts down after a predetermined period of inactivity.

(3) Communicates information posted from the web browser via the web server to a vault process.

(4) Forwards vault process responses to the web browser via the web server: The vault processes 17 are multi-threaded and able to handle multiple simultaneous requests from the user (who could be running multiple browser instances). Additionally, each thread has its own local storage area allowing it to maintain state across multiple browser server interactions. Multi-threaded architectures using shared virtual memory are described in the text, "Advanced Computer Architecture: Parallelism, Salability, Programmability" by K. Hwang, published by McGraw-Hill, Inc., New York, N.Y. (1993), Chapter 9, Section 9.2 (ISBN 0-07-031622-8).

Figure 2:
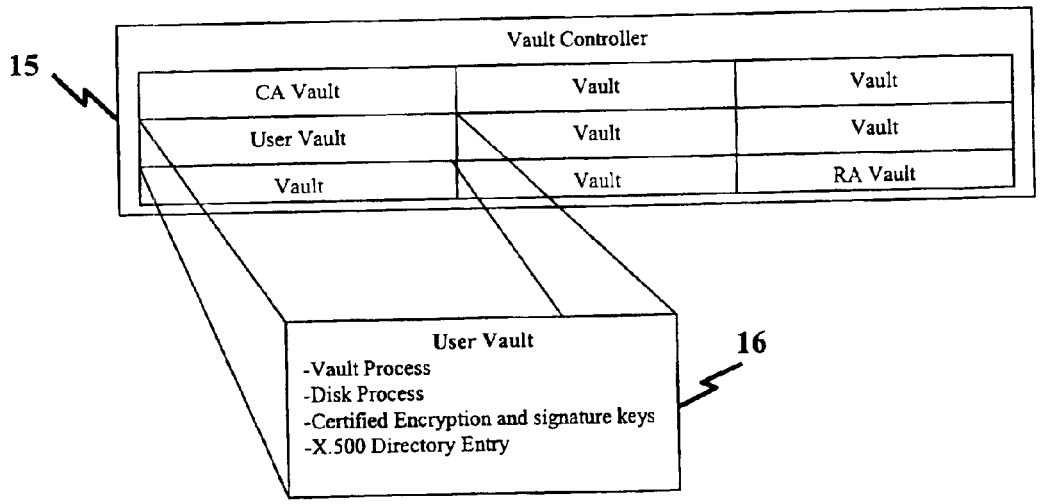
FIG. 2 is a representation of a vault for executing dedicated programs and applications on behalf of an assigned user using the vault controller of FIG. 1.

In FIG. 2, A vault 15 provides a secure environment e.g. a directory on disk only accessible with a vault access certificate for executing programs on behalf of a user. Each vault consists of:

(1) A vault process which runs on behalf of a vault owner: Each vault process runs under a unique UNIX user ID linked to an end-user with a specific browser certificate (referred to as a vault access certificate). The process can only be started by the vault process supervisor and only after a user presents a vault access certificate or ID associated with that vault.

(2) Disk storage included in the vault and owned by the same unique UNIX user ID that owns the vault process: Using the UNIX file permission scheme, only the user and a system administrator have permission to access the disk storage. However, because user vaults are encrypted, the information within them is kept private from the system administrator.

(3) Each vault process contains two certified public keys: One key pair is used for encryption and decryption. The other key pair is used for digital signing and signature verification. Routines for encryption and decryption, digital signing and signature verification are accessible to processes running in vaults. Vault processes use a library to encrypt and sign data for secure inter-process communication with other processes, and to decrypt data and verify signatures for data received from other vaults.

(4) The vault further includes an X.500 Directory entry which stores the vault's public key certificate provided by a Certification Authority as described in Ser. No. 09/223,766 (SE-9-98-003/1963-7246): Vault users use the public key and the certificate to encrypt data for other users vault so only the recipient vault can access the data.

(5) A Distinguished Name (DN) is recorded in the X.500 Directory with a common name based on the Vault ID: The encryption certificate is stored under this DN.

(6) A group writable queue and "public" directory is included for receiving encrypted messages.

A vault process that runs within a given vault means it has access to the vault private keys and obtains a handle on a security context. The security context allows it to decrypt incoming messages and other private data in the vault and to sign outgoing messages. If the vault process fails to establish a security context (e.g. wrong password or tampered keys) the process exits immediately.

Figure 3:
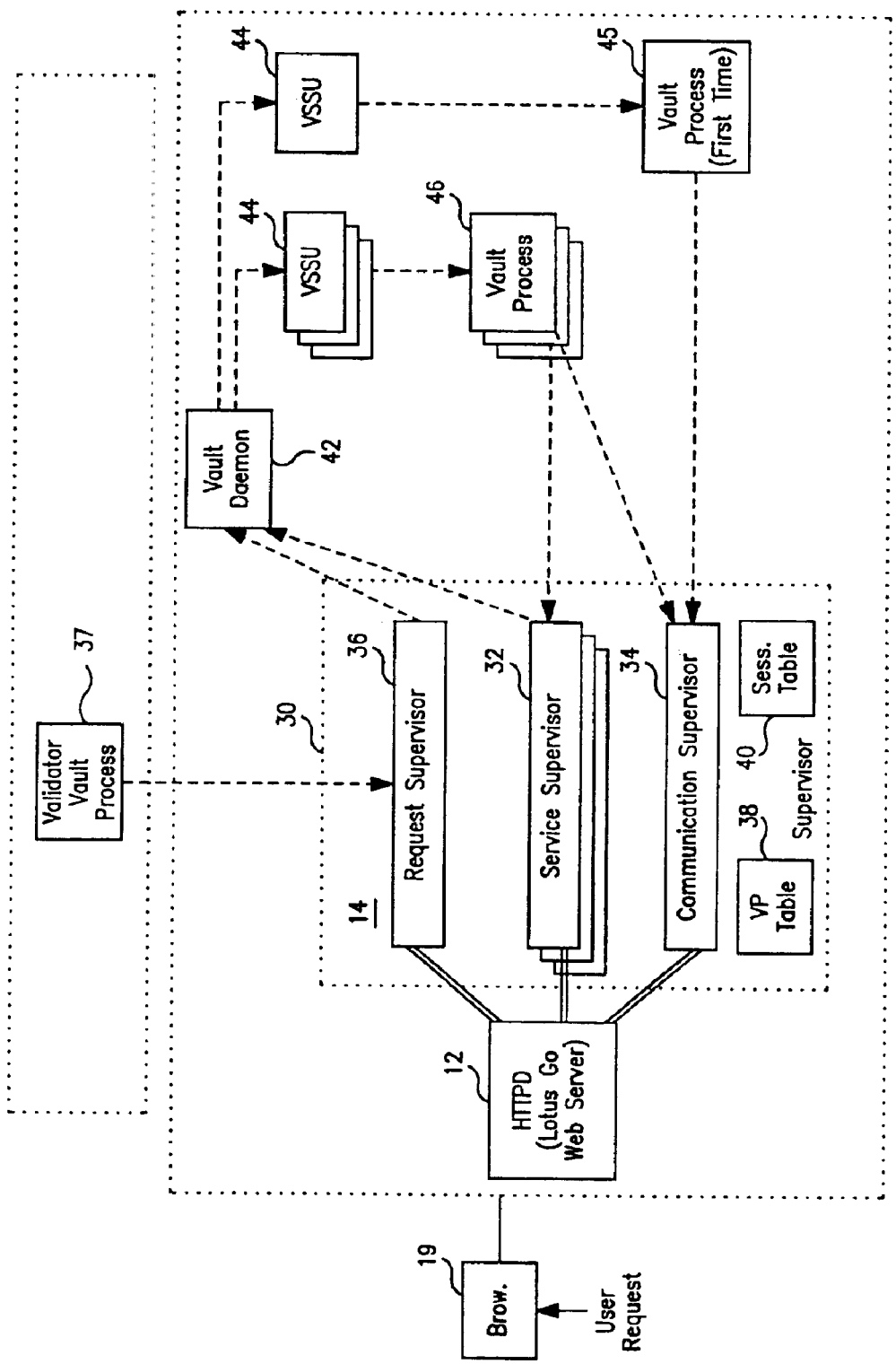
FIG. 3 is a block diagram of a vault process supervisor including a service supervisor, communications supervisor and request supervisor in a shared object library included in the vault controller of FIG. 1.

Turning to FIG. 3, the supervisor 14 shown in FIG. 1 will be described in further detail. The supervisor 14 is a multi-threaded process which runs in a shared object library (SOL) 30 and is loaded by the web server 12. The supervisor essentially acts as a link between the end user 18 (see FIG. 1) sitting at a browser and an application available in the controller to the end user.

The shared library 30 consists of two main programmatic functions: (1) vsSupervisor Initialize comprising a communication supervisor 34; a request supervisor 36 and state tables 38 and 40, and (2) vsSupervisor Service comprising multiple service supervisor threads 32. The supervisor is loaded by the HTTP daemon 12 to supervise vault processes in response to a user request. The function vsSupervisor Initialize is called at web server initialization. The function launches two "listener" processes as persistent threads. One thread serves as the communication supervisor 34. The other thread serves as the request supervisor 36. The vsSupervisor Service function is invoked in a separate thread after every successful browser connection.

A service supervisor 32 is invoked, in its own thread, on every successful connection to the web server. The thread persists until the thread is processed completely or an error is caught. The service supervisor performs the following tasks:

(1) User authentication and mapping: First the service supervisor makes sure that the user has connected using Secure Sockets Layer (SSL, v2) or higher, otherwise an error message is returned.

(1a) Process in Session Information Management: The service supervisor maintains a process table 38 and a session table 40 shown in FIGS. 3A and 3B (described hereinafter). If the client is successfully validated, the supervisor checks the process and session table for information about the user. The session table helps to maintain the continuity required in a single session while the process table provides information about active vault processes between sessions.

(1b) If a client authentication flag has been turned on, the service supervisor validates the client certificate taking into consideration the certificate revocation lists in a X.500 Directory, as described in Ser. No. 08/980,022 (SE9-97-005/1963-7131) (supra). If the validation is successful, the service supervisor maps the user to the assigned vault and either requests a vault daemon 42 to launch the corresponding vault process or reconnects the user to an active vault process if one was previously activated and is not, as yet, timed out.

(2) Vault Process Launch & Communication: Whenever a new request comes in, the supervisor checks the process table 38 to see whether the user vault process is up. If the process is up, the service request is sent to it; otherwise, the supervisor sends a request to a vault daemon 42 to launch the required vault process. The service supervisor thread then waits for the vault process response and returns it to the client.

(3) Access to Internet Connection Application Program Interface (ICAPI) Variables: Whenever a client connects to the server, the HTTP information, e.g., query-string, URL, HTTP-cookie, etc., associated with the session are passed on to the service supervisor as ICAPI variables. The service supervisor in turn passes them down to the vault process.

A communication supervisor 34 facilitates communication between a service supervisor thread and its corresponding process. The communications supervisor opens a socket connection on a TCP/IP port at initialization and waits for connections from newly launched vault processes. To establish communication with a service supervisor, a vault process must first connect to the communications supervisor port and send a "I'm alive" message to indicate the process is ready to accept browser requests. The process also presents a unique token shown in FIG. 3A (described hereinafter) to identify itself to the listener.

A request supervisor thread 36 is only launched to accept and carry out special requests on behalf of running vault processes. The only acceptable request is from a validator vault process 37 (to be described hereinafter) to start a first time vault process 45 for a newly created vault. The first invocation of this vault process completes the creation of the new vault. The request supervisor opens up a socket connection on a TCP/IP port and listens for messages from the validator vault process for launching vault processes for new vaults. The validator makes this request immediately after sending the vault access certificate to the browser. When a vault process is launched for the first time on behalf of the new user, it completes the creation of the vault before establishing communication with the supervisor. Without the request supervisor, the vault creation is completed when the end user first his/her vault.

The validator vault 37 is used by the controller for a Certificate Authority when a user connects to the controller and does not possess a vault access certificate. A validator process runs in the vault to process initial end user registration requests according to an organizations security requirement for applications available to end users through the controller.

A vault daemon 42 is a persistent process and together with the supervisor 14 forms a Trusted Computing Base (TCB) with access to a password that unlocks the TCB private key. The vault daemon 42 first launches the web server 12 and establishes a one-way pipe with it. The daemon then waits for a request from the service supervisor started by the web server to launch vault processes on behalf of end users. The vault daemon is launched from a monitor source (not shown) from which it receives a password to access the trusted computing base private key. At system start-up, the daemon launches the HTTP daemon as a separate process and establishes a one-way pipe with it. This pipe is inherited by the supervisor 14 which uses it to send requests to the vault daemon 42 for starting vault processes.

The vault daemon launches vsSU 44, a program that runs with UNIX root privileges to launch processes 46 which run under various user ID's. To launch a process the program 44 requires:

(1) A fully qualified, executable name to run;
(2) A UNIX user ID to run as;
(3) A fully qualified directory to run in;
(4) A password to either unlock the vault private key (description and signing) for vault processes; or
(5) To initiate sign on for other processes.

For a vault process, the program 44 determines whether the vault ID exists or not (the user ID is the same as the vault ID). If it does, the program performs a UNIX command setuid for that user ID and UNIX command fork/execs the target executable in the desired directory. If the user ID does not exist, the program 44 starts the creation of a new vault through the following steps:

(1) Add user ID for this ID to a password file;
(2) Creates a home directory; and
(3) Change ownership for the directory and its contents to a new vault ID.

Vault processes 46 are programs that run in an end user vault on behalf of that end user. The processes carry out user requests specified in a URL and return responses to the supervisor. The services provided by the vault processes are dictated by an application program supplied by a customer in the form of a shared library or libraries.

FIG. 3A describes the contents of a Vault Process Table (vpTable) 38 used by the service supervisor for tracking the status of vault processes. This table is indexed by a userID string. The userID is derived from the unique certificate serial number from the presented access certificate. If a certificate was not presented or was invalid, then a userID relating to a validator vault (as opposed to a personal user vault) is retrieved from the configuration file based on the request.

The table comprises the following columns for each process running in a vault for a user request entered as a row in the tablet:

(a) UserID: A digital string containing the UNIX user ID (mapped from a certificate serial number or a Validator Vault user ID, if no certificate or invalid certificate presented).

(b) Token: A random unsigned long integer generated by the Supervisor and returned as part of a Vault Process (VP) start up. The token is used for validation purposes to verify the VP was launched by the Supervisor.

(c) Validator Flag: A flag set to true if user ID is a Validator Vault user ID.

(d) Process ID: A UNIX process identifier corresponding to the Vault Process (VP) and returned as part of the VP start-up.

(e) VP Start Flag: A flag that indicates that the VP is up and running. Set to false if the VP is shut down.

(f) Socket: An open UNIX file descriptor used to communicate between the Supervisor and Vault Process. The descriptor is returned as part of the VP start-up.

FIG. 3A provides examples of vault processes running for different user IDs. In row 1, a user vault process is running as UNIX process ID=32436 for user ID aaA51 with an open file descriptor (3) in the Supervisor for communication. The VP presented token 999999999 when it started up to authenticate the process to the Supervisor. In row 2, a validator VP is running under process ID=46352 and user ID aaA7 with an open file descriptor (4) in the Supervisor for communication. The VP presented token 88888888 when it started up to authenticate the process to the Supervisor. In row 3, a user vault process was running (it has since shut down) under process ID=37463 and user IDS aaA7f with a now closed file descriptor (5) in the Supervisor for communication. The VP presented token 7777777 when it started up to authenticate the process to the Supervisor.

FIG. 3B describes the contents of a Vault Session Table (vsTable) 40 and comprises the following columns for each vault process running in a vault:

(a) Session ID: A hashed SSL session ID retrieved from the Web server and guaranteed to be unique for a given web server instance.

(b) User Name (ID): A digital string containing the UNIX user ID (mapped from a certificate serial number or a Validator Vault user ID, if no certificate or invalid certificate presented).

(c) Certificate: A complete 64-bit encoded certificate (null for Validator user IDs).

(d) KRO Flag: A flag which indicates whether the session was initiated from a Vault Access Certificate on a Key Ring Organizer (KRO).

FIG. 3B provides examples of active user SSL sessions. In row 1, a session exists for user vault process running under user ID=aaA51 with a valid certificate stored in a web browser. In row 2, a session exists for a validator vault process running under user ID=aaA7. In row 3, a session exists for a user vault process running under user ID=aaA45 with a valid vault access certificate stored in a key ring organizer.

The session 40 is used in the Supervisor to provide the ability to ""know"" when a user is revisiting the server via the same SSL session. This allows certificate data to be retrieved from the table instead of performing a time consuming ASN.1 parsing operation. The userID and Certificate are such fields providing information necessary for later processing. Also, if the Supervisor is being used in combination with a Key Ring Organizer (KRO), a field is set to allow a special processing path for this case (as the Vault Access Certificate may be on the KRO instead of in the Browser). A Key Ring Organizer is described in copending application, Ser. No. 08/980,022, filed Nov. 26, 1997, assigned to the same assignee as that of the present invention and fully incorporated herein by reference.

Figure 4:
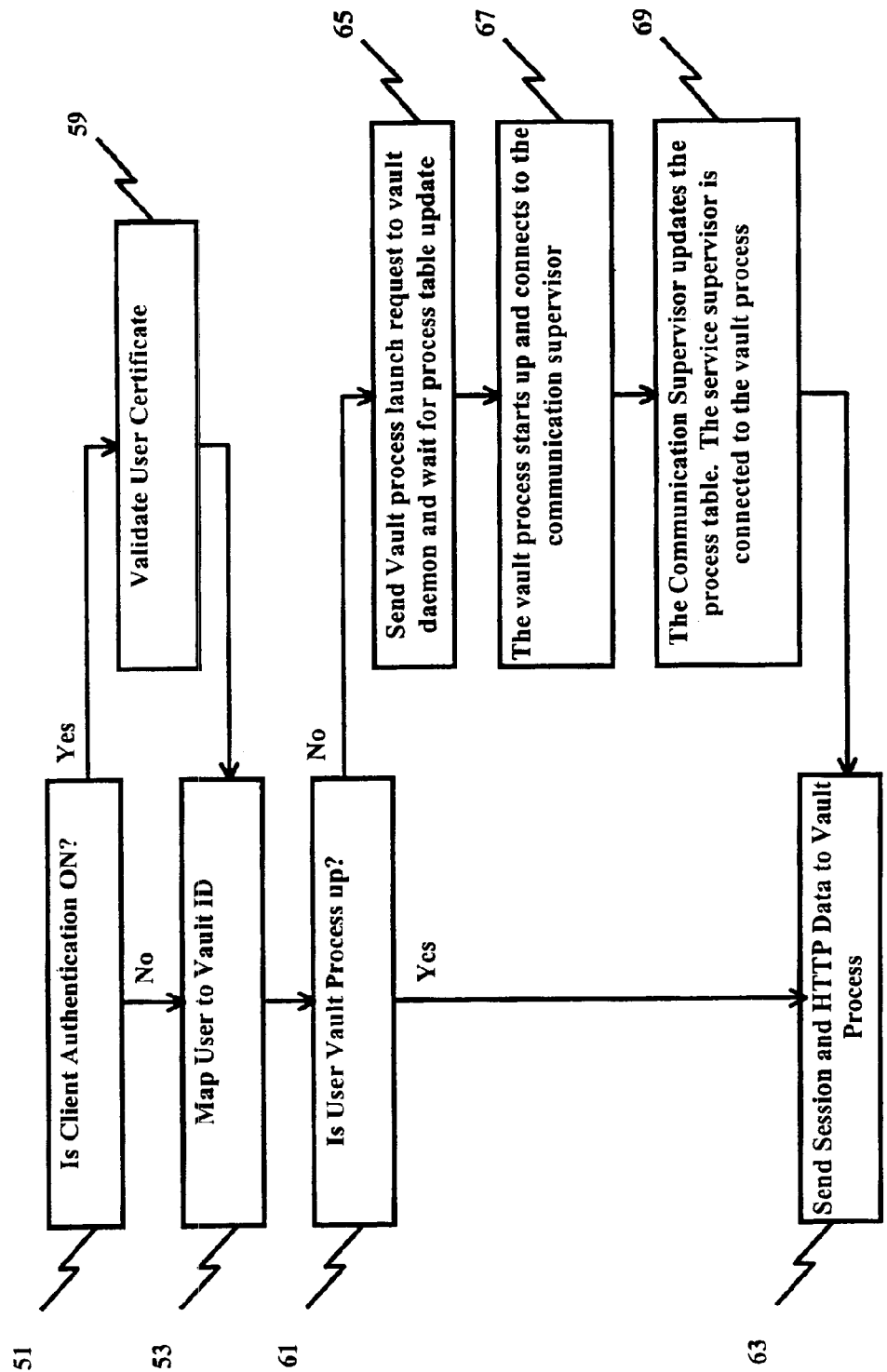
FIG. 4 is a flow diagram of launching a vault process in the vault controller of FIG. 1.

In FIG. 4, a process 50 will be described in conjunction with FIG. 3 for starting a vault process. A test 51 is performed to determine if the client authentication is on. A "no" condition initiates block 53 which maps the user to a validator vault ID. A "yes" condition initiates block 59 which validates the user's certificate and moves the program to block 53. Thereafter, a test 61 is performed to determine if the user vault process is up and running as described in the process table 38. A "yes" condition advances the program to block 63 in which the HTTP data are sent to a vault process. A "no" condition for the test 61 initiates block 65 which sends the vault process launch request to the vault daemon 42 to await process table 38 update. After the update, the program advances to block 67 which the vault process starts and connects to the communications supervisor 34. In block 69 the supervisor updates the process table 38 and the service supervisor is connected to the vault process. The program steps to block 63 in which the session and HTTP data are sent to the vault process to initiate the vault process which will be further described hereinafter in FIG. 6.

Figure 5:
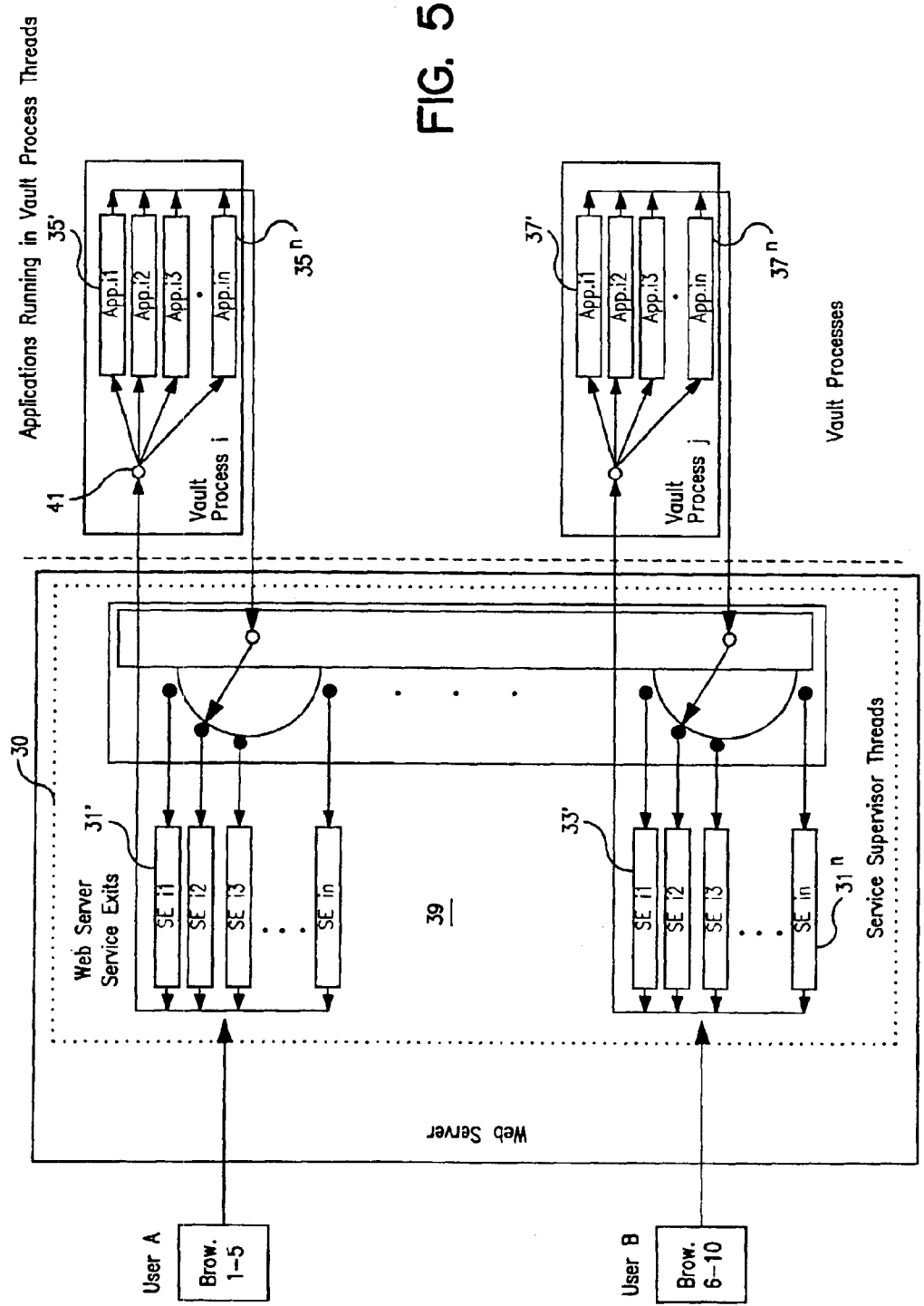
FIG. 5 is a block diagram of service supervisor threads multiplexed to applications running in vault process threads in the vault controller of FIG. 3.

FIG. 5 shows the multiplexing aspects of the vault supervisor in linking service supervisor threads 31 and vault process threads 33. The multiplexing aspects of the supervisor enables multiple users to submit multiple requests which are processed concurrently. In FIG. 5, user A has 5 requests running on his browser. Likewise, user B has 5 requests running on his browser. Each service request from users A and B are picked up by supervisor threads $31^1$ . . . $3^n$ and $33^1$ . . . $33^n$ linked to Vault Process threads $35^1$ . . . $35^n$ and $37^1$ . . . $37^n$, respectively through the Supervisor serving as a logical multiplexer 39. As previously described, the first supervisor will create an initial row in the process table 38 (and initiate the vault daemon 42 to launch the vault process. A dispatcher (not shown) in the form of software in the Vault Process will then start 5 threads in the vault process, each linked to its corresponding supervisor thread, and each with the thread ID of the Supervisor thread it is supporting (passed to the Vault Process as part of the request). When the Vault process thread completes the operation it has information to be sent back to the browser. V thread outputs this message back to the Supervisor with the corresponding thread ID of the Supervisor service thread which made the request. When the message comes in to the supervisor, a check is made by each supervisor thread to see if the process information is for them or not. If it is for a given service supervisor thread, then the information will be processed and forwarded to the browser.

Figure 6A:
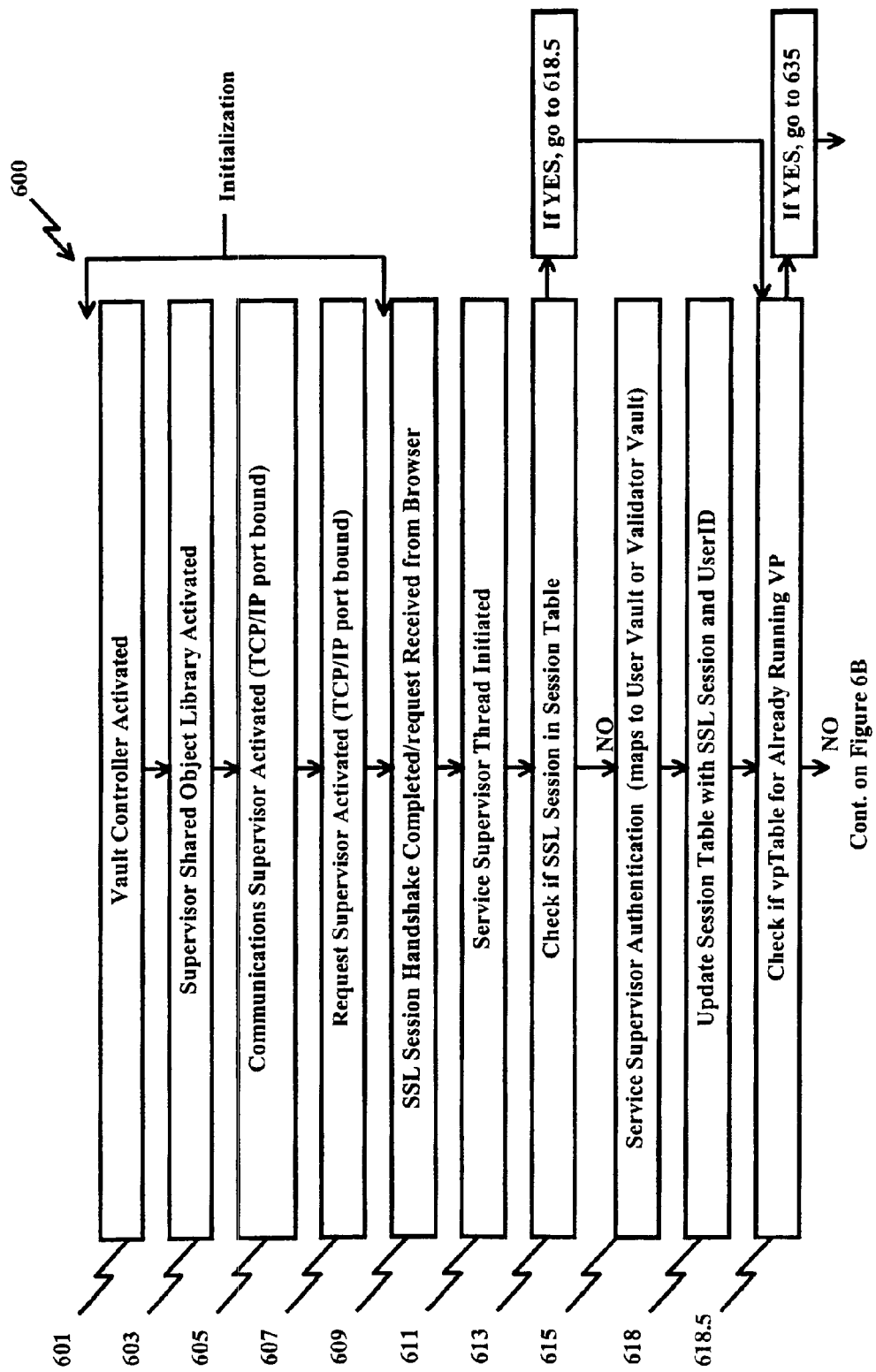
FIGS. 6A and B are flow diagrams of the operation of the vault controller of FIG. 1.
Figure 6B:
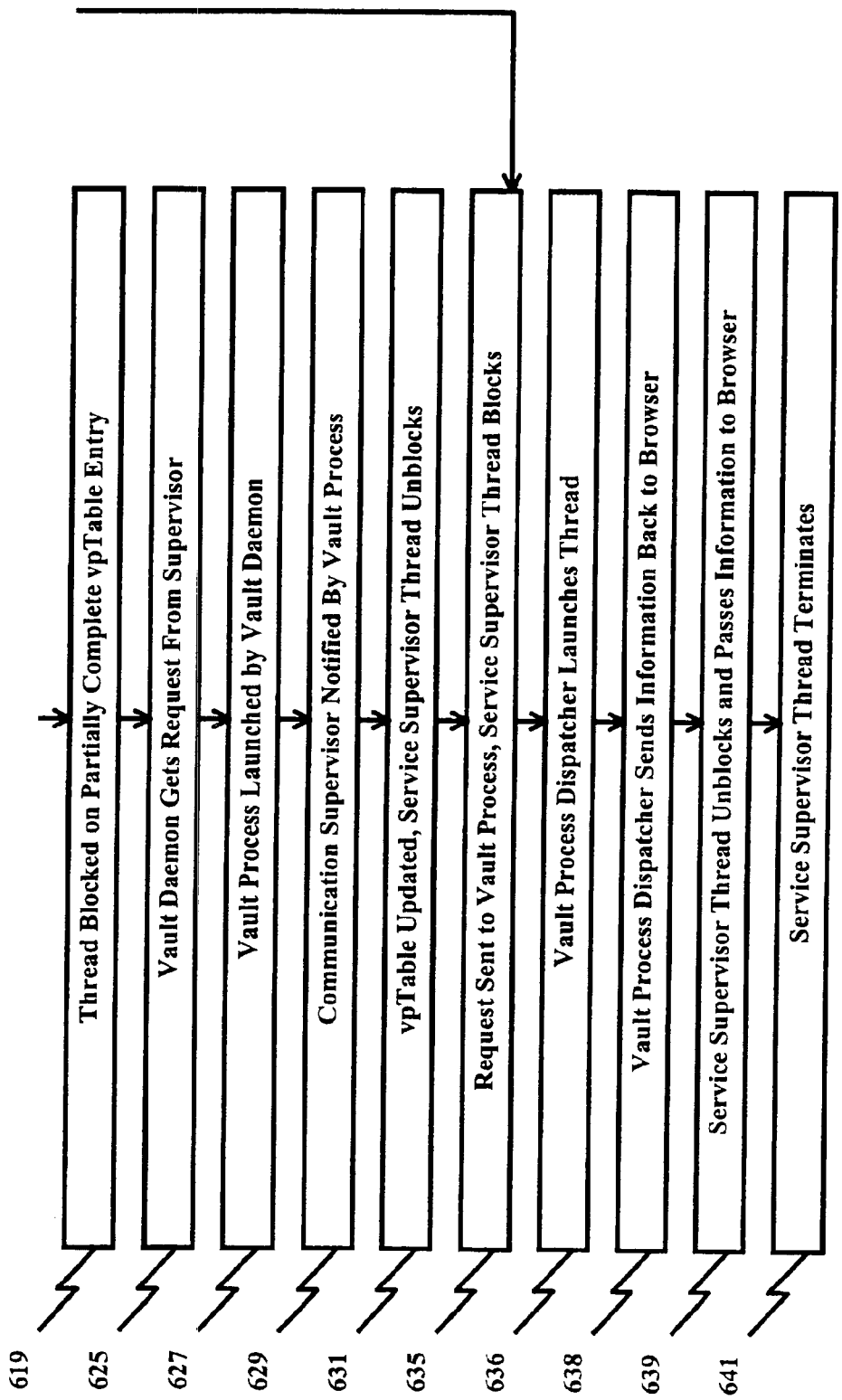

The operation of the vault controller will now be described in FIGS. 6A and B taken in conjunction with FIGS. 3–5. The vault controller is activated in step 601 in which the vault daemon 42 starts the web server HTTP daemon 12. The web server invokes the supervisor shared object library 30 in step 603 after which step 605 initializes the communication supervisor 34 which opens a TCP/IP port for later communication between the service supervisor 32 and the vault processes 46. The request supervisor 36 is launched in step 607 and opens a TCP/IP port for later communications between the service supervisor and certain privileged vault processes for the purpose of unsolicited vault launch. Initialization is now completed. The remaining steps handle the individual user requests.

In step 609 the SSL handshake between the browser and web server is completed and a user request (which may or may not include a vault access certificate) is received by the web server from the browser, after which in step 611 the web server initiates a service supervisor thread 31' (See FIG. 5) to handle the request. In step 613, the session table 40 is checked to see if this is a new SSL session or not. If it is not a new session, then there is no need to parse the certificate to obtain the userID and it can be retrieved from the table and the program advances to step 618.5, described hereinafter. Otherwise, in step 615, the service supervisor determines if the user authentication flag has been turned "on" in the request and, if so, proceeds to validate the client and user's certificate taking in to consideration any Certificate Revocation Lists (CRL) entry in the X.500 directory.

If the certificate is not present or was invalid, the user request is directed to the validator vault 37 typically used for generation of a user certificate for future use. Additionally regardless of whether the user is mapped to a personal or a validator vault the following steps are taken.

In step 618, the session table 40 is updated with the SSL session ID and user ID. In step 618.5, the Supervisor queries the Vault Process table 38 to determine if there is a vault process active for this userID. If there is a process active, the process skips to step 635. If not, the service supervisor thread sends a request to the vault daemon, and the thread is blocked from further processing in step 619 until a response is received from the communications supervisor in a step 625.

The vault daemon starts the vsSU program 44 in step 627 under a different UNIX ID. The vault daemon uses the trusted computing based private key to sign a unique token corresponding to the vault and generates a vault password from it. After which the process starts vsSU 44, passing the private password and other sensitive information through standard input of a forked UNIX process. Non-sensitive information is passed as environmental variables.

In step 629, the launched vault process 46 for the user connects back to the communications supervisor 34 which unblocks the service supervisor thread 31' in step 631 for communication with the vault process thread 33" (See FIG. 5) assigned to handle the user requests. The communications supervisor 34 takes the token and other information and enters the data into the vault process table 38 in step 631 after which the service supervisor 32 is unblocked for communication with the active vault process.

In step 635, the user request is sent to the vault process. The Supervisor Service thread then blocks waiting for a response back from the vault process (where the response contains the Supervisor Service thread ID). In step 636 the Vault Process Dispatcher receives the user request and launches a Vault Process thread to process it. After processing the request, in step 638 the Vault Process thread returns a response (with the Supervisor Service thread embedded in the header of the message) back to the Supervisor. In step 639, the Supervisor Service thread determines that this is the response that matches its thread ID and unblocks and reads the response. The V response is passed back through the web server to the user browser. At this time the Supervisor Service thread terminates in step 641.

End-to-end security for user for registration is achieved as follows:

1. SSL provides a secure communication layer between the browser and the web server. The user generates a private/public key pair in the browser and sends the public key as well as other registration information to the web server.

2. The Supervisor is launched within the Web Server address space and therefore can access Web Server data securely. The Supervisor requests launching of the Validator Vault process (as needed) by sending a request to the Vault Daemon (along with the vpTable token).

3. The Vault Daemon contains a shared pipe with the Supervisor so therefore the request can be passed on securely. The Vault Daemon generates a password to access the vault keys and launches vsSU 44.

4. vsSU is forked from the Vault Daemon so information can be inherited and is therefore secure. vsSU performs a UNIX setuid operation to become the Validator Vault Process user and launches the Validator Vault Process.

5. The Validator Vault Process is forked from vsSU so information can be inherited and is therefore secure. The Validator vault process accesses the vault keys (through inherited information) and is now able to encrypt/decrypt and sign using these keys. The Validator Vault sends a message back to the Communication Supervisor along with the token (inherited).

6. The Communication Supervisor verifies the token and now communication between the running Vault Process and the Supervisor is secure. The Supervisor Service thread unblocks and sends information to the Validator Vault Process 7. The Validator Vault Process receives the information (including the public key) and securely communicates with a Certification Authority to have the key certified (using a Secure Depositor protocol described in Ser. No. 09223,766 filed Dec. 31, 1998 (SE 9-98-003/1963-7246, supra).

8. The Vault Access Certificate is securely sent back through the Validator Vault to the Supervisor and eventually back to the user's browser.

End-to-end security for user personal vault access is the achieved by:

1. SSL again provides a secure communication layer between the browser and the web server, and additionally the user is prompted to present his/her Vault Access Certificate.

2. Again, the data is securely passed through to the Supervisor.

3. The Supervisor securely maps the user to his/her vault ID via the Vault Access Certificate.

4. Repeat steps 3–6 above end security for user registration, except the user enters personal vault instead of the validator vault.

5. The personal vault is now ready to receive user requests for work to be performed in his/her vault.

6. Vault process information is returned to the browser through the supervisor.

Summarizing, a vault controller manages resources in a secure environment or vault dedicated to an authorized user in conducting electronic business in a distributed information system, e.g., the Internet. The vault controller includes a web server and vault supervisor for managing multiple browser requests linked to assigned processes running in a secure vault in a shared object library. Each request includes a certificate identifying the user for trusted computing. The vault controller includes a service supervisor for handling multiple user requests as threads in a multiple thread environment. Each thread is linked to a vault process thread after validation of the request certificate. A communication supervisor conducts communication between the supervisor and the vault processes through multiple sockets on a TCP/IP port. A vault process table and session table are maintained by the service supervisor and updated by the communication supervisor to provide a "stateful" environment for the otherwise "stateless" distributed information system. A request supervisor in the controller launches vault processes for new vaults after validation of the user in a validator vault.

While the invention has been described in a preferred embodiment, various changes may be made therein without departing from the spirit and scope of the invention as defined in the appended claims, in which.

What is claimed is:

1. A method for use in establishing a secure exchange of information between an end user and a server in a distributed network environment, the method comprising the steps of:

in accordance with a network-based controller supervisor associated with the server and in communication with the end user and an application in the server, wherein the controller supervisor supervises processes in response to user requests, the controller supervisor:

invoking a service function in a separate service thread after a successful server connection, wherein the service thread enables user request mapping; and invoking an initialize function at server initialization for launching at least one persistent thread that facilitates communication between at least one service thread and a corresponding process.

2. The method of claim 1, wherein the at least one persistent thread comprises:

a communication thread that facilitates communication between the at least one service thread and the corresponding process; and a request thread that facilitates communication for special requests for processes.

3. The method of claim 1, wherein user request mapping comprises the steps of:

maintaining a process table and a session table; and validating certificates.

4. The method of claim 3, wherein the step of validating certificates comprises the steps of:

mapping a presented certificate to a user ID; and mapping a request to a validator if a certificate is not presented.

5. The method of claim 4, wherein the step of maintaining a process table and a session table comprises the steps of:

determining if the user ID exists in the session table;

creating a row in the session table if the user ID does not exist and blocking the service thread responding to the user request until the corresponding process has been launched; and sending a message to a daemon to generate a password for the end user based on the userID.

6. The method of claim 5, further comprising the steps of:

determining whether the corresponding process is on the process table; and launching the corresponding process by the daemon if the corresponding process is not on the process table.

7. The method of claim 6, further comprising the steps of:

sending the user request to the launched corresponding process;

launching a process thread linked to the service thread to process the user request; and returning resulting data to the controller supervisor and the end user.

8. The method of claim 6, further comprising the steps of:

sending a message to the communication thread having a token identifying the service thread;

verifying the token and populating the corresponding process table entry with the token; and unblocking the service thread which then sends the user request to the corresponding process mapped to the user ID which launches a process thread linked to the service supervisor thread to process the user request.

9. The method of claim 5, further comprising the steps of:

adding the user ID to a password file;

creating a home directory;

changing ownership for a directory and its contents to a new user ID;

launching the process under the new user ID; and forwarding the password to use to protect the private keys through a pipe.

10. The method of claim 1, further comprising the step of processing the user request without a certificate.

11. Apparatus for use in establishing a secure exchange of information between an end user and a server in a distributed network environment, the apparatus comprising:

a network-based controller supervisor associated with the server and in communication with the end user and an application in the server, wherein the controller supervisor supervises processes in response to user requests, operative to: (i) invoke a service function in a separate service thread after a successful server connection, wherein the service thread enables user request mapping; and (ii) invoke an initialize function at server initialization for launching at least one persistent thread that facilitates communication between at least one service thread and a corresponding process.

12. The apparatus of claim 11, wherein the at least one persistent thread comprises:

a communication thread that facilitates communication between the at least one service thread and the corresponding process; and a request thread that facilitates communication for special requests for processes.

13. The apparatus of claim 11, wherein user request mapping is operative to:

maintain a process table and a session table; and validate certificates.

14. The apparatus of claim 13, wherein the operation of validating certificates is operative to:

map a presented certificate to a user ID; and map a request to a validator if a certificate is not presented.

15. The apparatus of claim 14, wherein the operation of maintaining a process table and a session table is operative to:

determine if the user ID exists in the session table;

create a row in the session table if the user ID does not exist and blocking the service thread responding to the user request until the corresponding process has been launched; and send a message to a daemon to generate a password for the end user based on the user ID.

16. The apparatus of claim 15, further operative to:

determine whether the corresponding process is on the process table; and launch the corresponding process by the daemon if the corresponding process is not on the process table.

17. The apparatus of claim 16, further operative to:

send the user request to the launched corresponding process;

launch a process thread linked to the service thread to process the user request; and return resulting data to the controller supervisor and the end user.

18. The apparatus of claim 16, further operative to:

send a message to the communication thread having a token identifying the service thread;

verify the token and populate the corresponding process table entry with the token; and unblock the service thread which then sends the user request to the corresponding process mapped to the user ID which launches a process thread linked to the service supervisor thread to process the user request.

19. The apparatus of claim 15, further operative to:

add the user ID to a password file;

create a home directory;

change ownership for a directory and its contents to a new user ID;

launch the process under the new user ID; and forward the password to use to protect the private keys through a pipe.

20. The apparatus of claim 11, further operative to process the user request without a certificate.

21. An article of manufacture for use in establishing a secure exchange of information between an end user and a server in a distributed network environment, comprising a machine readable medium containing one or more programs which when executed implement the steps of:

in accordance with a network-based controller supervisor associated with the server and in communication with the end user and an application in the server, wherein the controller supervisor supervises processes in response to user requests, the controller supervisor:

invoking a service function in a separate service thread after a successful server connection, wherein the service thread enables user request mapping; and invoking an initialize function at server initialization for launching at least one persistent thread that facilitates communication between at least one service thread and a corresponding process.

* * * * *